(12) United States Patent
Gauss

(10) Patent No.: US 9,181,867 B2
(45) Date of Patent: Nov. 10, 2015

(54) CARRIER HOUSING FOR A TURBOCHARGER ARRANGEMENT

(71) Applicant: Walter Gauss, Neukirch (DE)

(72) Inventor: Walter Gauss, Neukirch (DE)

(73) Assignee: MTU Friedrichshafen GmbH, Friedrichshafen (DE)

( * ) Notice: Subject to any disclaimer, the term of this patent is extended or adjusted under 35 U.S.C. 154(b) by 401 days.

(21) Appl. No.: 13/651,136

(22) Filed: Oct. 12, 2012

(65) Prior Publication Data

US 2014/0102091 A1   Apr. 17, 2014

(51) Int. Cl.

| F02B 33/00 | (2006.01) |
|---|---|
| F02B 67/10 | (2006.01) |
| F02B 37/02 | (2006.01) |
| F01N 13/08 | (2010.01) |
| F01N 13/18 | (2010.01) |
| F02B 37/00 | (2006.01) |
| F02B 37/007 | (2006.01) |
| F02B 37/013 | (2006.01) |

(52) U.S. Cl.
CPC ............... F02B 67/10 (2013.01); F02B 37/02 (2013.01); *F01N 13/08* (2013.01); *F01N 13/1866* (2013.01); *F02B 37/001* (2013.01); *F02B 37/004* (2013.01); *F02B 37/007* (2013.01); *F02B 37/013* (2013.01); *Y02T 10/144* (2013.01)

(58) Field of Classification Search
CPC .. F02B 37/013; F02B 37/007; F02D 41/0007; Y02T 10/144
USPC ................... 60/612, 602; 123/559.1
See application file for complete search history.

(56) References Cited

U.S. PATENT DOCUMENTS

| 5,142,867 | A | * | 9/1992 | Bergmann et al. | ............... 60/612 |
|---|---|---|---|---|---|
| 5,692,378 | A | | 12/1997 | Ramsden | |
| 5,697,217 | A | * | 12/1997 | Ramsden et al. | ............... 60/612 |
| 2006/0137342 | A1 | * | 6/2006 | Delavan et al. | ................. 60/602 |

FOREIGN PATENT DOCUMENTS

| DE | 101 22 406 A1 | 11/2002 |
|---|---|---|
| JP | H0828287 A | 1/1996 |
| WO | WO-2012028767 A1 | 3/2012 |
| WO | WO-2012028768 A1 | 3/2012 |
| WO | WO-2012038037 A1 | 3/2012 |

* cited by examiner

*Primary Examiner* — Thai Ba Trieu
*Assistant Examiner* — Thomas Olszewski
(74) *Attorney, Agent, or Firm* — Fishman Stewart Yamaguchi PLLC

(57) ABSTRACT

A carrier housing for a turbocharger arrangement to be fastened at an internal combustion engine includes first, second and third fastening flanges for fastening to turbines of a respective one of a high-pressure turbocharger, a first low-pressure turbocharger, and a second low-pressure turbocharger. The carrier housing is configured such that exhaust can be guided to the turbines of the high-pressure turbocharger, the first low-pressure turbocharger and the second low-pressure turbocharger via a respective one of the first, second and third fastening flanges. The carrier housing includes at least one connection flange by which the fastening flanges are directly in a fluid-guiding connection, with the connection flange being further connected to an exhaust guidance such that exhaust flows from the internal combustion engine through the first and second connection flanges and directly to the carrier housing.

19 Claims, 3 Drawing Sheets

CARRIER HOUSING FOR A TURBOCHARGER ARRANGEMENT

TECHNICAL FIELD

The disclosure relates to a carrier housing for a turbocharger arrangement, as well as a turbocharger arrangement and an internal combustion engine.

BACKGROUND

From the German translation of a European patent publication with publication number DE 695 20 866 T2, a carrier housing is known for a turbocharger arrangement to be fastened at an internal combustion engine, which is fastened via a fastening section at the internal combustion engine. A first fastening flange is provided, at which a high-pressure turbocharger is mechanically fastened. A second fastening flange at the carrier housing serves for the mechanic fastening of a first low-pressure turbocharger, with a third fastening flange serving for the mechanic fastening of a second low-pressure turbocharger. The carrier housing here allows a mechanical fastening of a turbocharger arrangement at an internal combustion engine, with this allowing a two-step charging process, by both low-pressure turbochargers being switched parallel in reference to each other and being arranged serially with the high-pressure turbocharger, particularly arranged downstream thereof, seen in the direction of flow of the exhaust. Here, particularly for large internal combustion engines, such two-step turbocharger arrangements are preferred with two parallel low-pressure turbochargers, compared to arrangements with only one low-pressure turbocharger, because they can be built smaller and connected to each other in a more compact fashion than a single, comparatively large low-pressure turbocharger.

At the carrier housing of prior art, the turbochargers are arranged such that they are supplied with exhaust via separated line sections, extending at least sectionally inside the housing. The carrier housing therefore represents only a type of mechanical cover for the turbocharger arrangement, which itself serves no exhaust guidance but instead accepts additional guidance elements for this purpose, which must be guided separately out of said housing. This way, the carrier housing of prior art requires a relatively large structural space and cannot be arranged at the internal combustion engine in an optimally space-saving fashion. Furthermore, it shows a relatively high weight, which is even further increased by the additional pipeline sections for guiding the exhaust.

SUMMARY

A carrier housing for a turbocharger arrangement is disclosed herein, which is embodied more compact and lighter than carrier housings of prior art, with it additionally performing further functions, besides the pure mechanical fastening of the turbocharger arrangement. A turbocharger arrangement with such a carrier housing is also disclosed, as well as an internal combustion engine with such a turbocharger arrangement.

In one exemplary arrangement, the carrier housing is configured such that first, second, and also a third fastening flange represent parts of an exhaust pipeline formed by the carrier housing itself. Here, exhaust can be guided to a turbine of a high-pressure turbocharger through the first fastening flange, at which it can be mechanically fastened, wherein a turbine of a first low-pressure turbocharger can be supplied with exhaust via the second fastening flange, at which it is mechanically fastened, and wherein a turbine of a second low-pressure turbocharger can be supplied with exhaust via a third fastening flange, at which it can be mechanically fastened, when the turbines of the turbocharger are fastened at the allocated fastening flanges. The carrier housing itself therefore represents an exhaust pipeline, through which in the assembled state exhaust is fed via the fastening flange to the turbines of the turbocharger. Here, the carrier housing comprises at least one connection flange, being in a fluid-guiding connection with the fastening flanges, with the connection flange being embodied to connect to the exhaust guidance, through which the exhaust can flow from the internal combustion engine to the carrier housing. Thus, via the connection flange, the carrier housing—itself forming an exhaust pipeline—is connected to an exhaust guidance of the internal combustion engine so that exhaust can flow therefrom into the carrier housing. In the exhaust pipeline formed by the carrier housing, the exhaust is further guided to the fastening flanges and thus to the turbines of the turbocharger. Due to the fact that the carrier housing itself forms an exhaust pipeline, it not only serves for the mechanical fastening of the turbocharger arrangement but simultaneously also serves for exhaust guidance. This way it is not necessary to arrange separate pipeline sections in the carrier housing; thus, it can be embodied as a smaller, more compact, and lighter arrangement. Accordingly, it is also possible in an easier fashion to fasten the carrier housing at the internal combustion engine in a space-saving fashion, particularly to integrate it in an external form of the internal combustion engine.

In one exemplary arrangement, the exhaust pipeline formed by the carrier housing is embodied such that, as viewed in the direction of flow of the exhaust, the first fastening flange is arranged downstream in reference to at least one connection flange. The exhaust therefore flows, originating at the connection flange, to the first fastening flange. Here, the second and the third fastening flange are arranged downstream in reference to the first fastening flange. In one exemplary arrangement, the second and third fastening flange are arranged downstream parallel in reference to each other. Accordingly, only after having flown through the first fastening flange, the exhaust then also flows to the second and third fastening flanges, which are arranged parallel in reference to each other such that the exhaust flow forks upstream thereof and is divided between the second and the third fastening flange. It is therefore possible to realize a turbocharger arrangement with the help of the carrier housing, which allows a two-step charging with an upstream arranged high-pressure turbocharger and two low-pressure turbochargers switched parallel in reference to each other, jointly arranged downstream serially in reference to the high-pressure turbocharger.

In one exemplary arrangement, a carrier housing is configured with precisely two connection flanges, which may be arranged opposite each other, seen in the longitudinal extension of the carrier housing. With this configuration, it is possible to connect two exhaust pipelines originating at the internal combustion engine to the carrier housing, with the exhaust flowing into the carrier housing via two connection flanges, in one exemplary arrangement being guided together and jointly fed to the first fastening flange and thus to the turbine of the high-pressure turbocharger.

In another exemplary arrangement, a carrier housing is provided that includes a valve accept for mounting a valve. Here, the exhaust pipeline is embodied such that simultaneously the valve accept is arranged in reference to the exhaust pipeline such that a fluid path can be released or blocked by a valve arranged in the valve accept, through which the exhaust can be guided from at least one connection flange, bypassing the first fastening flange, to the second and third fastening flanges. With this configuration, it is possible via the valve to realize a fluid-guiding bypass of the first fastening flange and thus the high-pressure turbocharger, so that exhaust originating at the internal combustion engine can be guided directly to the two low-pressure turbochargers, bypassing the high-pressure turbocharger. Such a valve is also called a "waste-gate." Using this waste-gate it is possible in certain operating states of the internal combustion engine to bypass the high-pressure turbocharger. Here it is possible that the valve can assume only two discrete positions, by the fluid path being either released or completely blocked. However, it is also possible that the valve can assume several discrete intermediate positions or can be arranged continuously between its extreme positions. In this case, the exhaust flow can be divided upstream in reference to the high-pressure turbocharger, with a first portion of the exhaust flow being directly guided to the first and the second low-pressure turbochargers, while a second portion of the exhaust flow is first guided to the high-pressure turbocharger and then, originating therefrom, to the first and second low-pressure turbochargers. The possibility to provide such a waste-gate in the valve accept represents another integration of a function of the carrier housing in addition to the function of exhaust guidance accepted by it. In particular the carrier housing is embodied also as a high-pressure turbine bypass, in addition to its other functions.

In another exemplary arrangement, a carrier housing is disclosed that includes a connection flange for the connection to an exhaust pipeline. The connection flange is here embodied and arranged such that exhaust can flow from the outlet of the turbine of the high-pressure turbocharger to the connection flange when the turbine of the high-pressure turbocharger is fastened at a first fastening flange, and when the exhaust guidance is connected to the outlet of the turbine of the high-pressure turbocharger on the one side and to the connection flange on the other side. The connection flange is here arranged, seen in the direction of flow of the exhaust, downstream in reference to the first fastening flange and upstream in reference to the second and third fastening flange. The exhaust flow leaves the carrier housing when entering the turbine of the high-pressure turbocharger. Accordingly, an option must be provided to return the exhaust leaving the high-pressure turbine to the carrier housing. For this purpose, it is generally possible for the carrier housing to directly comprise another fastening flange, which can be connected to the output of the high-pressure turbine. However, this is frequently impossible or disadvantageous for geometric reasons. Instead, in on exemplary arrangement, a connection flange is provided in order to fasten an exhaust guidance at the carrier housing, through which the exhaust can flow from the output of the high-pressure turbine to the connection flange and thus back into the carrier housing. The exhaust guidance is here may be embodied as a pipeline. This way, the exhaust first flows through the first connection flange into the high-pressure turbine and therefrom through the exhaust guidance back through the connection flange into the carrier housing, where it is divided and fed parallel to the first and the third fastening flange.

In one exemplary arrangement, a carrier housing is configured with an oblong form. Here, a first connection flange is arranged at a first end of the carrier housing, while a second connection flange is arranged at a first end, opposite to the second end seen in the longitudinal direction of the carrier housing. As described above, exhaust passes through the first and the second connection flange into the carrier housing, is merged therein, and fed to the high-pressure turbine. When the carrier housing is arranged with its longitudinal direction perpendicular in reference to an internal combustion engine, exhaust guidances arranged on the opposite sides of the internal combustion engine may be connected to the opposite connection flanges. The carrier housing therefore shows another function, by creating a lateral connection between the exhaust guidances of the internal combustion engine and here merges the exhaust inflowing from two sides. The first fastening flange may be arranged centrally between the first and the second end of the carrier housing. This configuration provides an advantage because, this way, the exhaust inflowing from two sides may be combined approximately in the center of the carrier housing and at this point of the turbine is fed to the high-pressure turbocharger. The second fastening flange may be arranged in the proximity of the first end and the third fastening flange may be arranged in the proximity of the second end. By passing the high-pressure turbine, the exhaust is here may be divided in the carrier housing and, seen in the longitudinal direction, guided in opposite directions to the low-pressure turbochargers. In a respective arrangement of the carrier housing at an internal combustion engine, the exhaust is here therefore guided off laterally and fed to the low-pressure turbochargers quasi in lateral sections of the internal combustion engine. This way, ultimately two lateral exhaust connections are provided, with the exhaust initially being collected in a first lateral connection and later being divided into two lateral connections. This exemplary configuration of the exhaust pipelines allows a particular compact arrangement of the carrier housing at an internal combustion engine, while it can particularly beneficially be integrated in its exterior form, particularly arranged at a face thereof laterally.

An exemplary turbocharger arrangement is also disclosed which comprises a high-pressure turbocharger as well as a first and a second low-pressure turbocharger. The turbocharger arrangement is characterized in that it includes a carrier housing according to one of the above-described exemplary arrangements. Here, a turbine of the high-pressure turbocharger is fastened at a first fastening flange, with a turbine of the first low-pressure turbocharger being fastened at the second fastening flange. A turbine of the second low-pressure turbocharger is fastened at the third fastening flange. An exhaust guidance, for example a pipeline, is connected to an outlet of the turbine of the high-pressure turbocharger on the one side and to the connection flange of the carrier housing on the other side. In this manner, exhaust that has left the carrier housing through the first fastening flange in the high-pressure turbine can flow via the exhaust guidance and the connection flange back into the carrier housing, where it is then further divided to the low-pressure turbochargers.

A valve may be arranged in a valve accept of the carrier housing so that by the valve a fluid path can be released or blocked through which exhaust can be guided from at least one connection flange, bypassing the first fastening flange, to the second and the third fastening flange. The turbocharger arrangement therefore comprises a so-called waste-gate so that a bypass of the high-pressure turbocharger can be implemented.

Thus the following flow path for the exhaust preferably results inside the turbocharger arrangement: It comes from the internal combustion engine, enters through at least one connection flange into the carrier housing and is guided therefrom to the first fastening flange as well as the valve accept. If applicable, using the valve at least a portion of the exhaust flow is guided past the first fastening flange directly to the second and third fastening flange. The remaining portion of the exhaust flow or the entire exhaust flow passes through the first fastening flange into the high-pressure turbine. The exhaust flows through the output of the turbine into the exhaust guidance and through it as well as through the connection flange back into the carrier housing, with the exhaust flow being divided into a first partial flow, flowing to the first low-pressure turbocharger, and into a second partial flow, flowing to the second low-pressure turbocharger. The first partial flow passes the second fastening flange and flows through it into the turbine of the first low-pressure turbocharger. The second partial flow passes the third fastening flange and passes through it into the turbine of the second low-pressure turbocharger.

An internal combustion engine is also disclosed that includes a turbocharger arrangement according to one of the above-described exemplary embodiments. Here, an exhaust guidance originating at the internal combustion engine is connected to at least one connection flange so that the exhaust can flow from the internal combustion engine to the carrier housing. The exhaust ejected by the cylinders of the internal combustion engine therefore flows through the exhaust guidance to at least one connection flange and passes through it into the carrier housing.

An internal combustion engine may be embodied as a V-engine, with it comprising a first and a second cylinder bank arranged at an angle in reference to each other and opposite each other in a V-shape. The cylinders of each cylinder bank are aligned subsequently, seen in the longitudinal direction of the internal combustion engine. The first cylinder bank is allocated to a first exhaust guidance, which is connected to the first connection flange of the carrier housing, with the second cylinder bank being allocated to a second exhaust guidance connected to the second connection flange of the carrier housing. The internal combustion engine may also include a carrier housing, which shows precisely two connection flanges, namely the first connection flange connected to the first exhaust guidance and the second connection flange connected to the second exhaust guidance. The first and the second exhaust guidances may each be arranged laterally at the internal combustion engine in the area of the first or the second cylinder bank, respectively, such that it faces an exterior side of the internal combustion engine. In an alternative exemplary embodiment of the internal combustion engine, it is provided that the first and the second exhaust guidance are not provided laterally at the outside of the internal combustion engine, but rather located inside thereof. In this case, it may be useful for it to be integrated in an interior geometry of the internal combustion engine. When the internal combustion engine is embodied as a V-engine, it is possible, for example, to arrange one of the exhaust guidances in a clear space formed between the V-shaped arranged cylinder banks, thus quasi between the legs of the V. Of course, it is also possible to arrange both exhaust guidances here. It is also possible in an exemplary embodiment for one of the exhaust guidances to be arranged laterally at the internal combustion engine, while the other exhaust guidance is arranged located inside.

An exemplary arrangement of an internal combustion engine is disclosed wherein a carrier housing is arranged at a facial side thereof such that the longitudinal direction of the carrier housing is aligned laterally, and in one exemplary arrangement, perpendicularly in reference to the longitudinal direction of the internal combustion engine defined by the serial alignment of the cylinders. Here, the first connection flange is arranged in the proximity of the first cylinder bank, and the second connection flange is arranged in the proximity of the second cylinder bank. Thus, the carrier housing extends at a facial side, for example at a driving side of the internal combustion engine in the lateral direction, an in one exemplary arrangement, horizontally, with the connection flanges arranged in the proximity of the first and second cylinder bank each being provided at the ends along the longitudinal extension of the carrier housing, thus laterally in reference to the cylinder banks or to the exhaust guidances originating in the cylinder banks. Accordingly, the carrier housing realizes a first lateral connection for the exhaust flow, by the exhaust flows originating at the cylinder banks laterally entering the carrier housing and here flowing to the first fastening flange, and in one exemplary arrangement, arranged generally centrally, where they are merged. Accordingly, the carrier housing may implement a second lateral connection, by which the exhaust flow coming from the high-pressure turbine through the connection flange enters the carrier housing in the center and from here is divided into two partial flows, with a first flow flowing to the second fastening flange arranged in the proximity of the first end, and with a second partial flow flowing to the third fastening flange arranged in the proximity of the second end. Here, accordingly the two low-pressure turbochargers are arranged at opposite sides of the internal combustion engine defined by the cylinder banks. Overall, this way a very compact arrangement of the turbocharger arrangement is possible at the internal combustion engine, allowing for the integration of the carrier housing easily in an exterior form of the internal combustion engine. The turbochargers are also provided compactly and space-savingly at the carrier housing and distributed in the area of the internal combustion engine.

BRIEF DESCRIPTION OF THE DRAWINGS

In the following exemplary arrangements of the disclosure are explained in greater detail using the drawing whereby.

DETAILED DESCRIPTION

Figure 1:
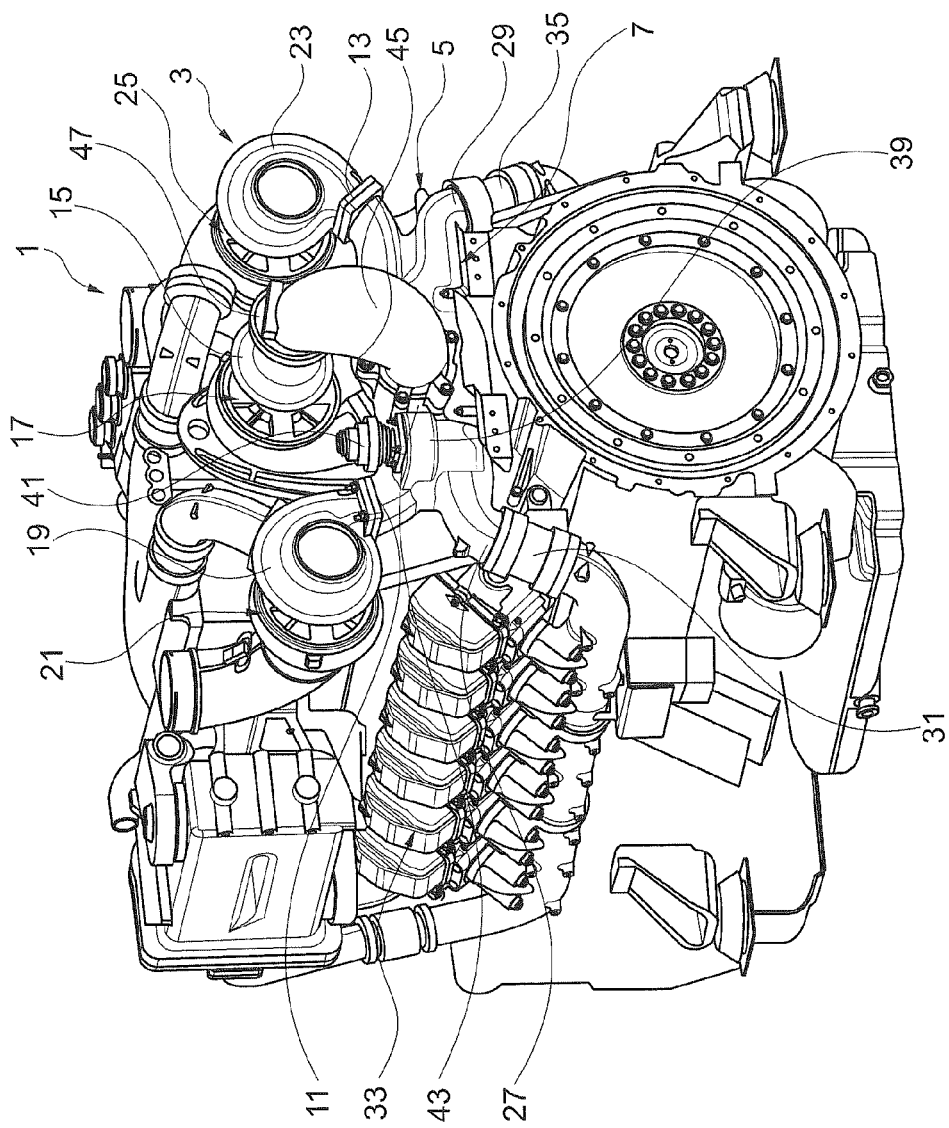
FIG. 1 is a first three-dimensional illustration of an exemplary embodiment of an internal combustion engine with a turbocharger arrangement comprising a carrier housing.

FIG. 1 shows an exemplary embodiment of an internal combustion engine 1 comprising a turbocharger arrangement 3 including a carrier housing 5.

The carrier housing 5 comprises a fastening area 7 by which it is mechanically fastened at the internal combustion engine 1. The carrier housing 5 further comprises a first fastening flange 9, hidden in FIG. 1 but shown in FIG. 2, a second fastening flange 11, and a third fastening flange 13. A turbine 15 of a high-pressure turbocharger 17 is fastened at the first fastening flange 9. A turbine 19 of a first low-pressure turbocharger 21 is fastened at the second fastening flange 11 and a turbine 23 of a second low-pressure turbocharger 25 is fastened at a third fastening flange 13.

The carrier housing 5 additionally shows a first connection flange 27 as well as a second connection flange 29. The first connection flange 27 is connected to a first exhaust guidance 31 so that exhaust ejected by the first cylinder bank 33 can enter through the exhaust guidance 31 via the first connection flange 27 into the carrier housing 5.

Figure 2:
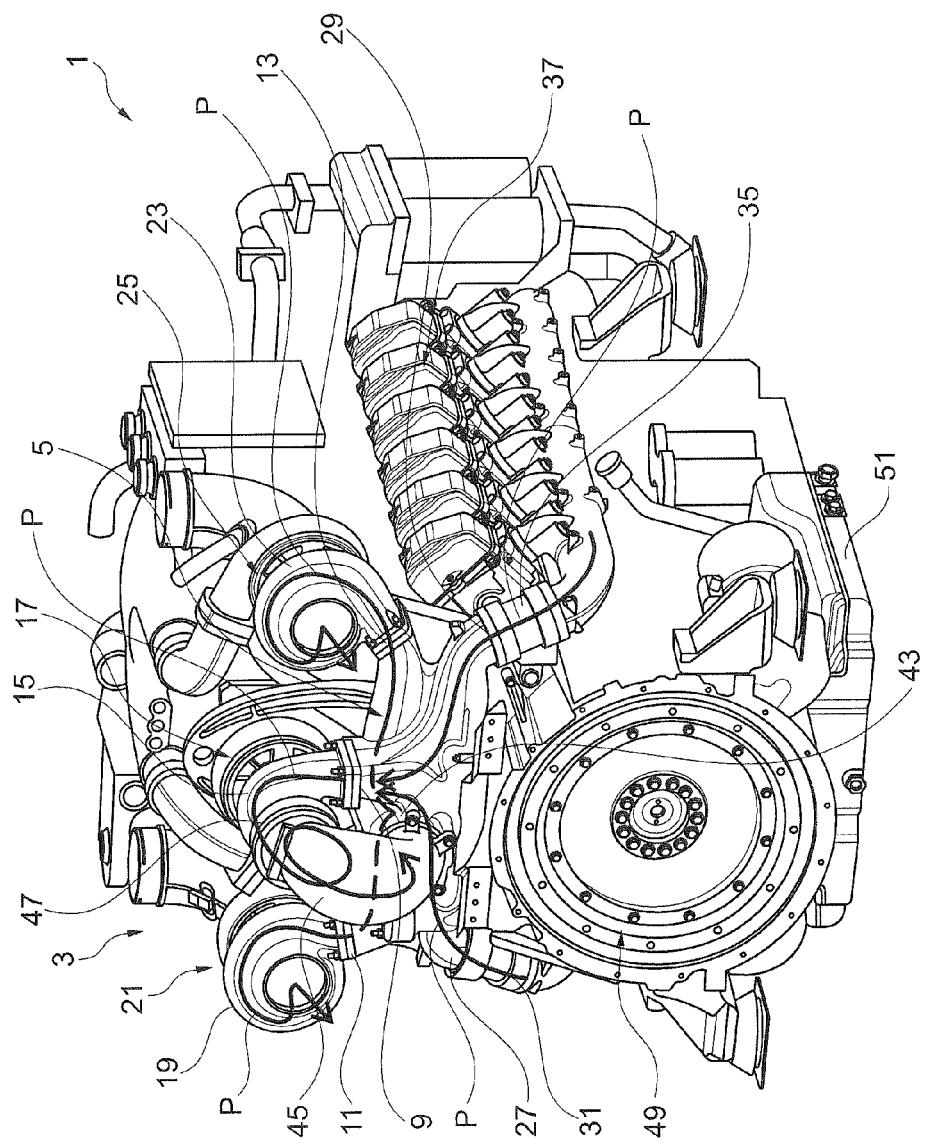
FIG. 2 a second view of the exemplary embodiment according to FIG. 1.

The second connection flange 29 is connected to a second exhaust guidance 35, through which exhaust from a second cylinder bank 37, hidden in FIG. 1 but shown in FIG. 2, can flow through the exhaust guidance 35 and the second connection flange 29 and thus can enter the carrier housing 5.

The carrier housing 5 also comprises a valve accept 39, in which a valve 41 is arranged, a so-called waste-gate, in order to release or block a bypass for the exhaust flowing from the connection flanges 27, 29, bypassing the first fastening flange 9, to the second fastening flange 11 and the third fastening flange 13. The valve 41 is dependent on an operating point of the internal combustion engine 1, and may be controlled by a motor control device, in order to allow a variable amount of exhaust bypassing the high-pressure turbine 15.

Furthermore, the carrier housing 5 comprises a connection flange 43, connected to a third exhaust guidance 45 here embodied as a curved pipeline. The third exhaust guidance 45 in turn is connected to an output 47 of the turbine 15 of the high-pressure turbocharger 17 so that exhaust ejected from the high-pressure turbine 15 can flow through the third exhaust guidance 45 and through the connection flange 43 back into the carrier housing 5.

The carrier housing 5 forms an exhaust line, through which the exhaust flowing from the cylinder banks 33, 37 is guided to the turbines 15, 19, 23 connected to the carrier housing 5. The exhaust flows occurring here are indicated schematically by arrows P in FIG. 2. Here, FIG. 2 shows a second view of the exemplary embodiment of the internal combustion engine 1 according to FIG. 1. Identical elements or those with identical functions are marked with the same reference characters so that in this regard reference is made to the above description.

The flow paths shown in FIG. 2 and indicated by the arrows P represent an operating state in which the valve 41 blocks a fluid path bypassing the first fastening flange 9 so that no bypass of the high-pressure turbine 15 is implemented. Accordingly, the exhaust flow entering the carrier housing 5 flows entirely through the high-pressure turbine 15.

Coming from the cylinder banks 33, 37, the exhaust passes via the exhaust guidance 31, 35 and the connection flanges 27, 29 into the carrier housing 5. As shown in the figures, the carrier housing 5 shows an essentially oblong form, extending laterally in reference to its longitudinal direction, particularly perpendicular in reference to a longitudinal direction of the internal combustion engine 1 defined by the cylinder banks 33, 37. Here, the carrier housing 5 is arranged at a facial side, particularly a driving side of the internal combustion engine 1. Here, it is arranged and integrated in a space-saving fashion directly via the output 49 of the internal combustion engine 1 and thus optimally in its exterior form. The first connection flange 27 is arranged, seen in the longitudinal direction, at a first end of the carrier housing 5, while the second connection flange 29, also seen in the longitudinal direction, is arranged at an opposite end of the carrier housing 5. This leads to a lateral flow of the exhaust flows entering the carrier housing 5 towards each other, with them meeting generally centrally between the two longitudinal ends of the carrier housing 5 in the proximity of the fastening flange 9 and here are merged to form a total exhaust flow, which enters through the first fastening flange 9 into the turbine 15 of the high-pressure turbocharger 17. Here, the exhaust drives the turbine 15 and leaves it via the output 49, where it flows into the third exhaust guidance 45.

Through this guidance, it reaches the connection flange 43, through which it in turn enters the carrier housing 5. Here, the exhaust flow is once more divided into two partial flows, with a first partial flow flowing to the second fastening flange 11, which is arranged in the proximity of the first end of the carrier housing 5, thus in the proximity of the first connection flange 27, thus particularly laterally at the internal combustion engine 1 and in the proximity of the first cylinder bank 33.

The first partial flow enters through this second fastening flange 11 into the turbine 19 of the first low-pressure turbocharger 21. Finally, it exits it in the direction of an exhaust system, not described in greater detail.

A second partial flow flows in a direction opposite to the first partial flow to a third fastening flange 13, arranged in the proximity of the second end of the carrier housing 5, thus in the proximity of the second connection flange 29, here laterally at the internal combustion engine 1 in the proximity of the second cylinder bank 37. Thus, overall, a distribution of the exhaust flow entering through the connection flange 43 into two lateral flows develops, which are aligned quasi in opposite directions as the exhaust flows initially entering through the connection flanges 27, 29 into the carrier housing 5. The second partial flow passes through the third fastening flange 13 into the turbine 23 of the second low-pressure turbocharger 25, drives it, and leaves it in the direction of an exhaust system, not described here in greater detail.

It shows that the first connection flange 27 and the second connection flange 29 are angled slightly downwards towards the cylinder banks 33, 37, seen in the longitudinal direction of the carrier housing 5. In one exemplary arrangement, the fastening flanges 9, 11, 13 are aligned rather upwardly, though, with, in the exemplary embodiment shown, the first fastening flange 9 being aligned directly upwards while the second and the third fastening flange 11, 13 are curved slightly diagonally upwards. Here, the descriptions "upwards" and "downwards" relate to the position of installation of the internal combustion engine 1, which ultimately is predetermined by the position of an oil pan 51, with the oil pan 51 always being arranged at the bottom.

The connection flange 43 is aligned in an exemplary embodiment shown towards the facial side of the output 49 such that it can easily be connected via a third exhaust guide 45, and in one exemplary arrangement being bent by approximately 180°, to the appropriately aligned output 47 of the turbine 15.

Figure 3:
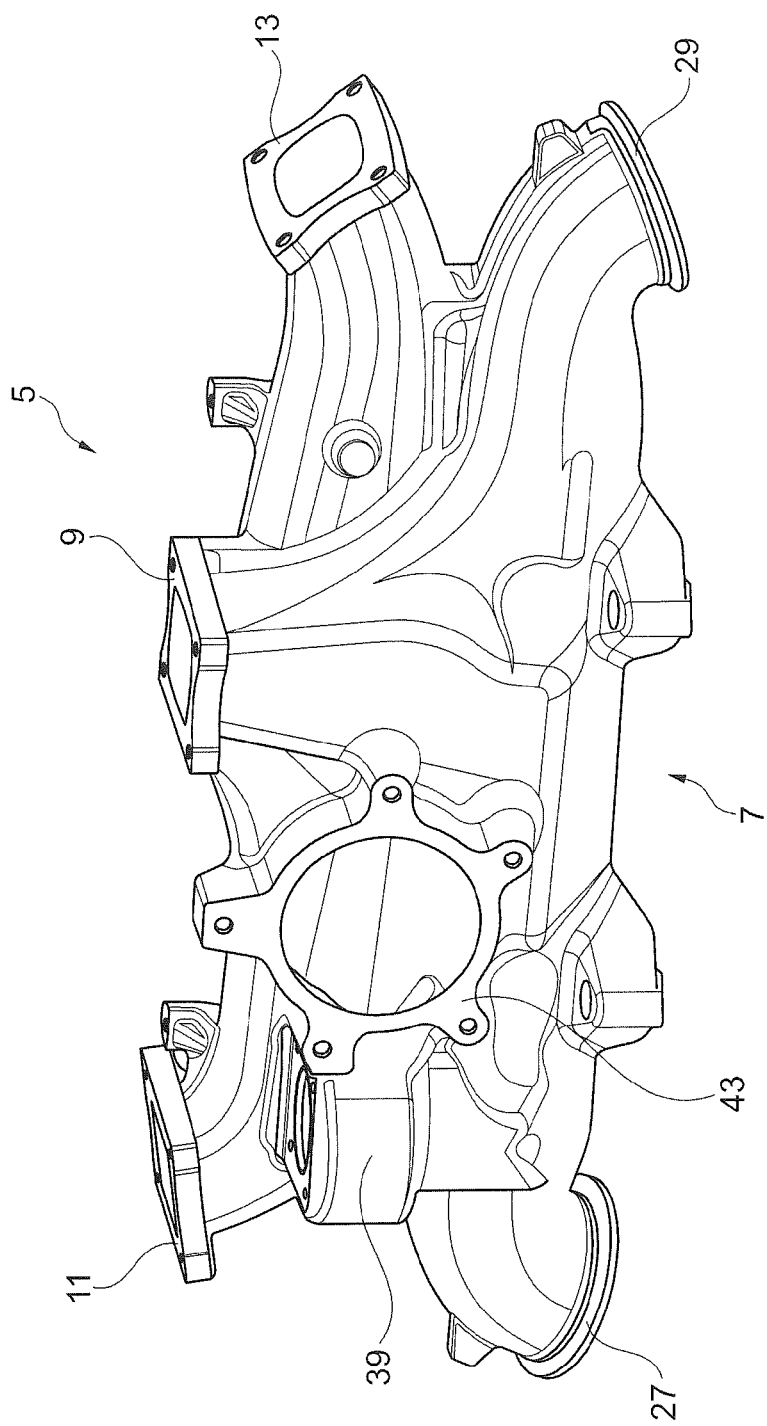
FIG. 3 a three-dimensional illustration of the carrier housing according to FIGS. 1 and 2.

FIG. 3 shows a three-dimensional illustration of the exemplary embodiment of the carrier housing 5 according to FIGS. 1 and 2, with identical elements and those with identical functions being marked with the same reference characters so that in this regard reference is made to the above description. The features and embodiments explained in the context of FIGS. 1 and 2 are particularly clearly discernible in FIG. 3, thus here too reference is made to the above-stated description of FIGS. 1 and 2.

It is discernible from FIG. 3 that the carrier housing 5 may be embodied in one piece, while in one exemplary embodiment it may also be provided that the carrier housing can be embodied in several parts and particularly from shell elements connected to each other. It is possible to form the carrier housing 5 as a cast part.

FIG. 3 shows a fastening area 7 by which the carrier housing 5 can be mechanically fastened at the internal combustion engine 1, for example using screws or stud bolts. Also shown are the fastening flanges 9, 11, 13 as well as the connection flanges 27, 29. The valve accept 39 and the connection flange 43 are shown in their geometric arrangement at the carrier housing 5.

Based on FIG. 3, it is particularly discernible that the carrier housing 5 itself forms an exhaust pipeline, with a wall of the carrier housing 5 encasing or limiting the flow paths formed therein. Additionally, it is discernible that a first flow path for the exhaust leads from the connection flanges 27, 29 to the first fastening flange 9, while a second flow path leads from the connection flange 43 to the second fastening flange 11 and to the third fastening flange 13.

The valve accept 39 is arranged such that it releases a fluid connection between the first flow path and the second flow path, so that a valve arranged in the valve accept 39, not shown in FIG. 3, can be directly guided from the connection flanges 27, 29 to the fastening flanges 11, 13, bypassing the first fastening flange 9.

Overall, it shows that, by the carrier housing 5, the turbocharger arrangement 3, and the internal combustion engine 1, a space-saving embodiment requiring few parts is possible, integrated in the form of the internal combustion engine 1, with weight being simultaneously saved because the carrier housing 5 assumes a plurality of functions. This particularly serves for an exhaust guidance including at least one, and in one exemplary arrangement, at least two lateral exhaust connections, the mechanical fastening of the turbochargers 17, 21, 25, and the integration of the waste-gate function, thus a high-pressure turbine bypass.

It is intended that the scope of the present apparatuses be defined by the following claims. However, it must be understood that this invention may be practiced otherwise than is specifically explained and illustrated without departing from its spirit or scope. It should be understood by those skilled in the art that various alternatives to the embodiments described herein may be employed in practicing the claims without departing from the spirit and scope as defined in the following claims. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future examples. Furthermore, all terms used in the claims are intended to be given their broadest reasonable constructions and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary. It is intended that the following claims define the scope of the invention and that the method and apparatus within the scope of these claims and their equivalents be covered thereby. In sum, it should be understood that the invention is capable of modification and variation and is limited only by the following claims.

What is claimed is:

1. A carrier housing for a turbocharger arrangement to be fastened at an internal combustion engine, with a fastening area for mechanical fastening of the carrier housing at an internal combustion engine, comprising:
    a first fastening flange for the mechanical fastening of a turbine of a high-pressure turbocharger at the carrier housing,
    a second fastening flange for the mechanical fastening of a turbine of a first low-pressure turbocharger at the carrier housing, and
    a third fastening flange for the mechanical fastening of a turbine of a second low-pressure turbocharger at the carrier housing;
    wherein exhaust is fed to at least one of the turbine of the high pressure turbocharger via the first fastening flange and both the turbine of the first turbocharger via the second fastening flange, and the turbine of the second low-pressure turbocharger via the third fastening flange when the turbines of the high-pressure and first and second low-pressure turbochargers are fastened at the first, second and third fastening flanges,
    wherein the carrier housing comprises first and second connection flanges in fluid-connection directly with the first fastening flange, with the first and second connection flanges being embodied to be further fluidly connected directly to an exhaust pipeline, such that exhaust flows from the internal combustion engine through the first and second connection flanges and directly to the first fastening flange.

2. A carrier housing according to claim 1, wherein as viewed in the direction of the exhaust flow, the first fastening flange is arranged directly downstream of the first and second connection flanges, with the second fastening flange and the third fastening flange being arranged directly downstream to the first fastening flange.

3. A carrier housing according to claim 2, wherein the first and second connection flanges are arranged opposite each other, as viewed along a longitudinal extension of the carrier housing.

4. A carrier housing according to claim 1, wherein the carrier housing comprises a valve accept to fasten a valve, and the valve is arranged in the valve accept, such that a fluid path can be released or blocked, through which exhaust can flow from at least one the first and second connection flanges, bypassing the first fastening flange, to the second and third fastening flanges.

5. A carrier housing according to claim 1, wherein a connection flange to be connected to an exhaust pipeline, so that exhaust can flow from an output of the turbine of the high-pressure turbocharger to the connection flange, when the turbine of the high-pressure turbocharger is fastened at the first fastening flange and when the exhaust guidance is connected on one side to the output of the turbine of the high-pressure turbocharger and on the other side to the connection flange, with the connection flange, seen in the direction of the exhaust flow, being arranged downstream in reference to the first fastening flange and upstream in reference to the second and third fastening flanges.

6. A carrier housing according to claim 1, wherein the carrier housing is configured with an oblong shape, with a first connection flange being arranged at a first end and a second connection flange at an opposite second end, seen in the longitudinal direction, with the first fastening flange being arranged in the middle between the first and the second end, and with the second fastening flange being arranged in the proximity of the first end and the third fastening flange in the proximity of the second end.

7. A carrier housing according to claim 1, wherein the carrier housing is configured such that exhaust gases flow laterally from the first and second connection flanges toward one another at the first fastening flange and merges centrally to form a total exhaust flow that enters through the first fastening flange.

8. A carrier housing according to claim 1, wherein the carrier housing is configured such that exhaust from the third connection flange divides into first and second partial flows directed laterally outward from one another, and the first and second partial flows enter a respective one of the second and third fastening flanges.

9. A carrier housing according to claim 1, wherein the carrier housing is made of one piece.

10. A carrier housing according to claim 1, wherein the carrier housing is a one piece casting.

11. A turbocharger arrangement with a high-pressure turbocharger as well as a first and a second low-pressure turbochargers, comprising:
    a carrier housing having first, second and third fastening flanges;

a high-pressure turbocharger having a turbine attached to the first fastening flange;

a first low-pressure turbocharger having a turbine attached to the second fastening flange; and a second low-pressure turbocharger having a turbine attached to the third fastening flange;

wherein exhaust is fed to at least one of the turbine of the high pressure turbocharger via the first fastening flange and both the turbine of the first turbocharger via the second fastening flange, and the turbine of the second low-pressure turbocharger via the third fastening flange when the turbines of the high-pressure and first and second low-pressure turbochargers are fastened at the first, second and third fastening flanges, wherein the carrier housing comprises first and second connection flanges in fluid-connection directly with the first fastening flange, with the first and second connection flanges being embodied to be further connected directly to an exhaust pipeline, such that exhaust flows from the internal combustion engine through the first and second connection flanges and directly to the first fastening flange.

12. A turbocharger arrangement according to claim 11, further comprising first and second exhaust guidances connected to a respective one of first and second connection flanges so that exhaust can flow from the internal combustion engine to the carrier housing.

13. A turbocharger arrangement according to claim 12, further comprising a third exhaust guidance connected to an output of the turbine of the high-pressure turbocharger on the one side and to a third connection flange of the carrier housing on the other side, and further comprising a valve arranged in a valve accept of the carrier housing such that a fluid path can be released or blocked by the valve through which exhaust can flow from at least one of the first and second connection flanges, bypassing the first fastening flange, to the second and to the third fastening flange.

14. A turbocharger arrangement according to claim 12, wherein the internal combustion engine is embodied as a V-engine with a first and a second cylinder bank, with the first exhaust guidance being allocated to the first cylinder bank connected to the first connection flange of the carrier housing, with the second exhaust guidance being allocated to the second cylinder bank, connected to the second connection flange of the carrier housing.

15. A turbocharger arrangement according to claim 14, wherein the carrier housing is arranged at a facial side of the internal combustion engine such that the longitudinal direction of the carrier housing is aligned laterally in reference to a longitudinal direction of the internal combustion engine with the first connection flange being arranged in proximity of the first cylinder bank and with the second connection flange being arranged in proximity of the second cylinder bank.

16. A turbocharger arrangement according to claim 11, wherein the carrier housing is configured such that exhaust gases flow laterally from the first and second connection flanges toward one another at the first fastening flange and merges centrally to form a total exhaust flow that enters through the first fastening flange.

17. A turbocharger arrangement according to claim 11, wherein the carrier housing is configured such that exhaust from the third connection flange divides into first and second partial flows directed laterally outward from one another, and the first and second partial flows enter a respective one of the second and third fastening flanges into the turbines of a respective one of the first and second low-pressure turbochargers.

18. A turbocharger arrangement according to claim 11, wherein the carrier housing is made of one piece.

19. A turbocharger arrangement according to claim 11, wherein the carrier housing is a one piece casting.

* * * * *